United States Patent Office 3,377,338
Patented Apr. 9, 1968

3,377,338
PROCESS FOR PREPARING N⁢ᵉ-TERTIARY BUTYLOXYCARBONYL-LYSINE AND ITS DERIVATIVES
Harm Jan Panneman, Oss, and Franciscus Hermanus Antonius Andreana van Bakel, Uden, Netherlands, assignors to Organon Inc., Orange, N.J., a corporation of New Jersey
No Drawing. Continuation-in-part of application Ser. No. 357,768, Apr. 6, 1964. This application June 15, 1967, Ser. No. 646,179
Claims priority, application Netherlands, Apr. 24, 1963, 291,930
8 Claims. (Cl. 260—207.1)

ABSTRACT OF THE DISCLOSURE

The invention relates to a convenient method of projecting the $\epsilon$-NH$_2$ group of L-lysine, in the synthesis of peptides, by substitution with the tert. butyloxycarbonyl group, comprising reacting an acid addition salt of an L-lysine ester in an anhydrous organic solvent, with tert. butyl-p. nitrophenyl carbonate or tert. butyloxycarbonylazide, in the presence of a lower aliphatic amine or piperidine. The resulting ester can further be converted to the N$^\alpha$-blocked derivative by substituting a group capable of protecting the $\alpha$-NH$_2$ group and the resulting N$^\alpha$-blocked-N$^\epsilon$-blocked-L-lysine ester can be saponified to the corresponding acid. The products of the conversions are useful as intermediates in the synthesis of peptides containing lysine as amino acid residue.

CROSS REFERENCE TO RELATED APPLICATION

This application is a continuation in part of application Ser. No. 357,768, filed Apr. 6, 1964.

The amino acid lysine is an important structural material of various natural, physiologically active peptides. It occurs, for instance, four times in the adrenocorticotrophic hormones (ACTH) of hogs, cattle and sheep, and that in the 11, 15, 16 and 21 positions of the amino acid sequence (see e.g. J. Am. Chem. Soc., 78, 5069 (1956).

The amino acid lysine contains three reactive groups, viz. a carboxyl group and an $\alpha$-NH$_2$ and an $\epsilon$-NH$_2$ group. In the synthesis of peptides containing lysine, usually involving the $\alpha$-amino group and the carboxyl group only, the basic $\epsilon$-amino group must be blocked to prevent side reactions (see, e.g. J. P. Greenstein and M. Winitz in Chemistry of the Amino Acids II, 1056–60 (1961).

In the synthesis of a peptide in which, e.g., lysine is present as N-terminal amino acid, the $\alpha$-NH$_2$ group must also be blocked. If the synthesis is continued at the side of the N-terminal lysine, it must be possible to split off the N$^\alpha$-substituent in such conditions that the N$^\epsilon$-protecting group is not affected. But if in the peptide to be synthesized lysine is present as C-terminal radical, only the $\epsilon$-NH$_2$ group must be protected, when the carboxyl group is usually esterified by one of the methods commonly used in the synthesis of peptides.

In the synthesis of a peptide in which lysine occurs as structural material, it must be possible to split off the group protecting the $\epsilon$-NH$_2$ function during the last step without affecting the remainder of the molecule formed.

BACKGROUND OF THE INVENTION

It is known from Angew. Chem., 72, 915/7 (1960) to apply the t.-butyloxy-carbonyl group successfully for the protection of the $\epsilon$-NH$_2$ group of lysine in the synthesis of peptide fragments of ACTH. This protecting group may be split off again at the end of the synthesis under relatively mild conditions, i.e. by treatment at room temperature with trifluoro acetic acid. In Helv. Chim. Acta, 44, 159–169 (1961) Schwyzer et al. describe the introduction of the t.-butylcarbonyl group into the $\epsilon$-NH$_2$ group by the action of t.-butyloxycarbonylazide as reagent on the lysine-copper complex of the formula

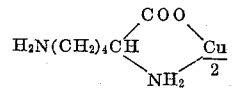

After the introduction of the N$^\epsilon$-t.-butyloxycarbonyl group the copper complex must still be decomposed with H$_2$S. As important intermediate product for the synthesis of biologically active peptides having ACTH activity and containing lysine an ester is applied of N$^\epsilon$-t.-butyloxycarbonyl-L-lysine. According to the publication mentioned above the latter is prepared in five reaction steps in a yield of less than 40% relating to lysine HCl.

SUMMARY OF THE INVENTION

A process has been found now for the preparation of a derivative of L-lysine of the general formula:

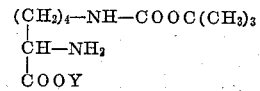

in which Y is selected from the group consisting of lower alkyl, aryl and aralkyl comprising the steps of
(a) Suspending an L-lysine-ester in which the amino groups are present as addition salts of a strong acid in an anhydrous organic solvent and
(b) Reacting it with a reagent selected from the group consisting of tert.-butyl-p.-nitrophenyl carbonate and tert.-butyloxycarbonylazide in the presence of a member selected from the group consisting of a lower aliphatic amine and piperidine.

The resulting N$^\epsilon$-tert.butyloxycarbonyl-L-lysine-ester can further be converted, to a crystalline N$^\alpha$-blocked N$^\epsilon$-tert.butyloxycarbonyl-L-lysine-ester by substituting at the N$^\alpha$-position a group capable of protecting the NH$_2$-group in the synthesis of peptides. The said blocked ester can be converted into the corresponding acid by saponification.

The above ester of N$^\epsilon$-tert.butyloxycarbonyl-L-lysine is obtained in this process in a yield of more than 60% relating to lysine.HCL. Starting from this ester the $\alpha$-NH$_2$ group of the lysine may be blocked, if desired, to prepare a peptide with an N-terminal lysine, e.g. by conversion with benzyloxycarbonylchloride or p.phenylazobenzyloxycarbonylchloride. The latter derivatives of lysine are crystalline compounds which may be easily obtained in a pure condition without chromatography, and in a higher yield than by the methods described in Helv. Chim. Acta 44, 159 (1961).

The final products obtained by the process of the invention are valuable starting products for the synthesis of biologically active peptides, notably ACTH.

The starting product of the present conversion, e.g. the L-lysine-methylester-2 HCl, may be obtained in a simple manner and in practically quantitative yield by the action of thionylchloride on L-lysine.HCl in methanol. The lysine-ester salt is converted as a suspension in the anhydrous organic solvent, for it was found by applicant that in a blocking reaction of the $\epsilon$-NH$_2$ group with a dissolved lysine-ester, prepared from the salt by the action of a base, bad results are obtained owing to the instability of the liberated lysine-ester. Under the reaction conditions according to the invention this difficulty is entirely obviated.

According to the invention the reagent, t.butyl-p.nitrophenyl carbonate or the t.butyloxycarbonylazide, described in the British patent specification No. 872,332 is allowed to act upon the known salts of L-lysine-alkyl, aryl or aralkyl esters, causing specifically the ε-NH₂ group to react. Of the two reagents suitable for the present purpose the t.butyl-p.nitrophenylcarbonate is preferably used, because after application of the other reagent the hydrazoic acid, which has a harmful action, is liberated. For preference this reaction is performed in ethylacetate. An organic base capable of liberating the ε-NH₂ group from its salt is employed. On application of equivalent quantities of the reaction components in the presence of 2 equivalents of triethylamine in ethylacetate as solvent, the desired Nᵉ-t.butyloxycarbonyl-lysine ester is obtained as hydrochloride in 60–65% yield.

For preference a lysine ester derived from a lower aliphatic alcohol, e.g., methanol, ethanol, propanol or t.butanol, is used as starting substance, but the conversion may also be performed with an aryl or aralkyl ester, e.g., the phenyl or the p.nitrophenyl ester or the benzyl ester. After blocking the ε-NH₂ group, and, if desired, also the α-NH₂ group, the ester obtained may, after isolation, be saponified, if desired, in a known manner. The identification of the thus obtained acid is performed in the simplest manner by means of one of its salts, e.g., the dicyclohexylamine salt.

In the starting product both amino groups are converted into their acid addition salts derived from a strong inorganic or organic acid. Mostly the double hydrochloride of the lysine ester is used. Numerous examples of suitable strong acids of this type are listed in Albertson et al., 3,062,805 at column 3, lines 8–17, including not only hydrochloric acid, but also HBr and HI, as well as sulfuric, phosphoric, methanesulfonic and p.toluenesulfonic acids. Other examples are given in British Patent No. 872,332 at page 1, line 44. L-lysine methylester sulfate and L-lysine methylester di-p.toluenesulfonate are prepared by esterification of L-lysine with an excess of methanol in the presence of the corresponding acid as a catalyst at room temperature; L-lysine methylester. $H_2SO_4$; is obtained in a yield of 52%, with a melting point of 195–197° C.; L-lysine methylester. $2C_7H_8O_3S$ is yield of 90%, with a melting point of 167.5–168.5° C. L-lysine methylester 2HBr can be prepared from L-lysine methylester.2HCl by converting the latter compound to the free base, by an aqueous potassium carbonate solution, followed by treatment of a solution of said base with dry hydrogen bromide; the yield is 78%, the melting point 177–178° C.

The blocking of the ε-NH₂ group is performed in an anhydrous organic solvent, such as chloroform, diethyl-ether, dioxane and tetrahydrofurane. For preference ethylacetate is used. For the liberaton of the ε-NH₂ group from its salts a lower aliphatic amine is applied, such as dimethyl or diethyl amine, triethyl amine, isopropyl amine and n.butyl amine or piperidine.

After protection of the ε-NH₂ group the α–NH₂ group may be blocked in a known manner with such agents as benzyloxycarbonylhalide, p.phenylazobenzyloxy-carbonylhalide and triphenylmethylhalide. For the application of the two first-mentioned agents for the blocking of amino groups reference is made to British patents specifications Nos. 872,332 and 895,344.

DESCRIPTION OF THE PREFERRED EMBODIMENTS

Further details of this process are to be found in the following examples, which are to be regarded as illustrative and not as limiting.

L-lysine-methylester.2HCl

Twenty-two ml. of thionylchloride are added dropwise, within 30 minutes, to 150 ml. of absolute methanol cooled to −10° C. After the addition of 27.4 gm. of L-lysine.1HCl the mixture is raised to room temperature and stirred at the is temperature for one hour. Next the reaction mixture is refluxed for four hours, after which it is evaporated in vacuo to about 50 ml. After the addition of absolute ether and cooling down to 0° C. the crystalline reaction product is sucked off and recrystallized from a mixture of methanol and ether to obtain 33.7 gm. of the ester (96%); melting point 211–212° C.

$$[\alpha]_D^{25} = +20.8°$$

(c.=1.09 in methanol).

Example I.—Nᵉ-t.butyloxycarbonyl-L-lysine-methylester.HCl (a) *By means of t-butyloxycarbonylazide.*—L-lysine-methylester.2HCl (44.8 gm.) is suspended in 220 ml. of ethylacetate. After cooling down to 0° C. 80 ml. of triethylamine are added and next slowly a solution of 22.9 gm. of t-butyloxycarbonylazide in 220 ml. of ethyl-acetate. Next the reaction mixture is shaken in a shaker. After completion of the reaction, the mixture is filtered, after which the filtrate is cooled. Next 456 ml. of a solution of 0.83 N HCl in ether are added. The precipitate formed is sucked off and washed with ether. The product is recrystallized from dioxane and next from a mixture of methanol and ether to obtain 22.5 gm. (47% on azide); melting point: 158–159° C.; $[\alpha]_D^{24} = +19.1°$ (c.=2.26 in methanol).

(b) *By means of nitrophenyl-t.butylcarbonate.*—L-lysine-methylester.2HCl (23.3 gm.) is suspended in 65 ml. of ethylacetate. After cooling to 0° C. 28 ml. of triethylamine are added and next slowly a solution of 23.9 gm. of p.nitrophenyl-t.butylcarbonate in 65 ml. of ethylacetate. Next the reaction mixture is shaken for some time at room temperature in a shaker till the reaction is complete. After filtration the filtrate is cooled down, whereupon 250 ml. of a solution of 0.4 N HCl% ether are added. The precipitate formed is sucked off and washed with ether. The product is recrystallized from dioxane and next from a mixture of methanol and ether to obtain 18.2 gm. of the final product (61%); melting point 157.5–159° C.; $[\alpha]_D^{28} = +19.0°$ (c.=1.34 in methanol).

Example II.—Nᵉ-t.butyloxycarbonyl-L-lysinemethylester.HCl 50.4 g. of L-lysinemethylester di-p.toluenesulfonate are suspended in 150 ml. of ethylacetate. After having cooled down to 0° C., 28 ml. of triethylamine are added. Next a solution of 23.9 g. of para-nitrophenyl t.butyl carbonate in 150 ml. of ethylacetate is added dropwise at 0–5° C. while vigorously shaking. After the addition is complete, the mixture is shaken at room temperature for an additional 24 hours and then filtered. After cooling to 0° C., 250 ml. of a 0.4 N hydrochloric acid solution in ether is added slowly to the above filtrate.

The desired product Nᵉ-t.butyloxycarbonyl-L-lysine methylester.HCl is recovered by essentially the same method as described in Example I(b).

The product, obtained in 55% yield melted at 157–158.5° C. and did not depress the melting point of a sample obtained according to Example I.

Example III.—Nᵃ-benzyloxycarbonyl-Nᵉ-t.butylcarbonyl-L-lysine-methylester

Nᵉ-t.butyloxycarbonyl-L-lysine-methylester.HCl (118.7 gm.) is dissolved in a solution of 800 ml. of 50% $K_2CO_3$ at 0° C. Next the aqueous solution is extracted with ether. The ether extract is evaporated to dryness, after which the residue is taken up in 800 ml. of dioxane-water (1:1). After the addition of 32 gm. of MgO and cooling down a solution of 75 gm. of benzyloxycarbonylchloride in 600 ml. of dioxane is slowly added. After that the reaction mixture is stirred for some time at room temperature and next filtered. The filtrate is concentrated in vacuo and the remaining aqueous solution extracted with ethylacetate. The resulting extract is washed with a solution of 5% citric acid and 1 N NH₄OH and next evaporated to dryness in vacuo, when the reaction product crystallizes. Yields 154 gm. (97%); melting point: 58–60° C. After recrystallization from a mixture of ethylacetate-petroleumether the melting point is 62.5–63.5° C.

$$[\alpha]_D^{28} = -11.2°$$

(c.=1 in acetone).

Example IV.—N$^\alpha$-benzyloxycarbonyl-N$^\epsilon$-t.butyloxy carbonyl-L-lysine N$^\alpha$-benzyloxycarbonyl - N$^\epsilon$ - t-butyloxycarbonyl-L-lysinemethylester (13.55 gm.) is dissolved in a mixture of 445 ml. of dioxane and 133 ml. of water. After cooling down to 0° C. 38 ml. of 1 N NaOH are added. The reaction mixture is stirred for 2 hours at room temperature. Next the pH of the reaction mixture is adjusted to 7 with carbonic acid, after which the dioxane is removed in vacuo. The remaining aqueous solution is extracted a few times with ethylacetate and next acidified with citric acid while cooling with ice to obtain the reaction product by extraction with ethylacetate.

After evaporation of this extract in vacuo the oily reaction product (12.98 gm.=99%) remains behind. For identification purposes a small sample of the oily reaction product was converted into the corresponding dicyclohexylamine salt with dicyclohexylamine after dissolving in ethanol; melting point 147–148° C.; $[\alpha]_D^{29} = +4.4°$ (c.=1.013 in methanol).

Example V.—N$^\alpha$-p.phenylazo-benzyloxycarbonyl-N$^\epsilon$-t.butyloxycarbonyl-L-lysine-methylester N$^\epsilon$-t.butyloxycarbonyl - L-lysine-methylester.HCl (59.4 gm.) is dissolved in 400 ml. of a solution of 50% K$_2$CO$_3$ at 0° C. Next the aqueous solution is extracted with ether. The ether extract is evaporated to dryness, after which the residue is taken up in 400 ml. of dioxane-water (1:1). After cooling the above solution and after the addition of 16 gm. of MgO a solution of 57.7 gm. p.phenylazo-benzyloxycarbonylchloride in 300 ml. of dioxane is slowly added dropwise. The reaction mixture is stirred for a short time at +5° C. and next at room temperature till the reaction is complete. After sucking off the precipitate the dioxane is removed in vacuo, after which the coloured reaction product is extracted with ethylacetate. The resulting extract is next washed with water and a solution of 5% citric acid and after that evaporated to dryness. The residue is crystallized from a mixture of ethylacetate and petroleumether. Yield: 82.5 gm. (83%); melting point 90–91° C. This product may be used as such for further conversion into the corresponding acid. For the performance of a microanalysis the product was recrystallized from ethylacetate-petroleumether. The melting point is then 93–94° C.; $[\alpha]_D^{24} = -5.6°$ (c.=1.01 in acetone).

Example VI.—N$^a$-p.phenylazo-benzyloxycarbonyl-N$^\epsilon$-t.butyloxycarbonyl-L-lysine N$^a$-p.phenylazo-benzyloxycarbonyl - N$^\epsilon$ - t.butyloxycarbonyl-L-lysine-methylester (82 gm.) is dissolved in 1200 ml. of dioxane. After cooling to +5° C. 665 ml. of water and 98 ml. of 2.0 N NaOH are added. The reaction mixture is stirred for 2 hours at +5° C. After dilution with 1 l. of water the pH of the solution is adjusted at 7 with carbonic acid, after which the dioxane is removed in vacuo. Next the pH of the solution is adjusted to 8.5 with a dilute solution of NaOH. After extraction of the aqueous solution with ether the extract is acidified with dilute HCl while cooling. The precipitated reaction product is extracted with ether. The ether extract is washed with water until neutral reaction and after drying over MgSO$_4$ concentrated to about 100 ml. After the addition of petroleumether an oil precipitates which crystallized quickly. Yield: 75.5 gm. (94%); melting point: 102–104° C. This product may be used as such for further conversion. In order to obtain an analysis sample the product was recrystallized from a mixture of etherpetroleumether. The compound obtained melts at 105–106° C.; $[\alpha]_D^{26} = -1°$ (c.=1 in methanol). From the reaction product a crystalline dicyclohexylamine salt was obtained; melting point: 182–183° C.

We claim:

1. Process for the preparation of a derivative of L-lysine of the formula:

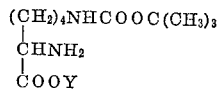

in which Y is selected from the group consisting of lower alkyl, aryl and aralkyl, comprising the steps of (a) suspending an L-lysine ester in which the amino groups are present as addition salts of a strong acid in an anhydrous organic solvent, and (b) reacting it with a reagent selected from the group consisting of tert-butyl-p-nitrophenyl carbonate and tert-butyloxycarbonylazide in the presence of a member selected from the group consisting of a lower aliphatic amine and piperidine.

2. The process of claim 1 in which the resulting N$^\epsilon$-tert-butyloxycarbonyl - L - lysine ester is converted to N$^\alpha$-blocked-N$^\epsilon$-tert-butyloxycarbonyl-L-lysine ester by substituting at the N$^\alpha$-position a group capable of protecting the NH$_2$ group in the synthesis of peptides.

3. The process of claim 2 in which the said blocked ester is converted to the corresponding acid by saponification.

4. The process of claim 1 in which said acid addition salt is a dihydrochloride.

5. The process of claim 1, in which an ester of an L-lysine salt derived from a lower aliphatic alcohol is taken as starting material.

6. The process of claim 1, in which the reaction is performed in ethylacetate.

7. The process of claim 1, in which the said lower aliphatic amine is triethylamine.

8. The process of claim 1, in which the said reagent is tert.butyl-p.nitrophenylcarbonate.

References Cited

UNITED STATES PATENTS

| | | |
|---|---|---|
| 3,095,408 | 6/1963 | Anderson et al. ___ 260—482 XR |
| 3,264,279 | 8/1966 | Schwyzer et al. ___ 260—482 XR |
| 3,325,466 | 6/1967 | Anderson et al. ___ 260—482 XR |

LORRAINE A. WEINBERGER, *Primary Examiner.*

A. P. HALLUIN, *Assistant Examiner.*